United States Patent [19]

Toub et al.

[11] Patent Number: 4,640,956

[45] Date of Patent: Feb. 3, 1987

[54] IODINE RESISTANT SILICONE RUBBER COMPOSITIONS

[75] Inventors: Melvin R. Toub; Donald L. Finney, both of Clifton Park, N.Y.

[73] Assignee: General Electric Company, Waterford, N.Y.

[21] Appl. No.: 744,848

[22] Filed: Jun. 13, 1985

[51] Int. Cl.$^4$ .............................................. C08K 3/22
[52] U.S. Cl. ................................... 524/779; 524/780; 524/783; 524/862
[58] Field of Search ............... 524/779, 780, 783, 862

[56] References Cited

U.S. PATENT DOCUMENTS

| | | | |
|---|---|---|---|
| 3,699,073 | 10/1972 | Wada et al. ........................ | 524/862 |
| 3,844,992 | 10/1974 | Antonen ............................. | 524/862 |
| 3,957,713 | 5/1976 | Jeram et al. ....................... | 524/783 |
| 3,957,717 | 5/1976 | Harada et al. ..................... | 524/862 |
| 3,969,310 | 7/1976 | Itoh et al. ......................... | 524/862 |
| 4,061,609 | 12/1977 | Bobear ............................... | 524/783 |
| 4,322,320 | 3/1982 | Caprino ............................. | 524/783 |
| 4,329,274 | 5/1982 | Faltynek ............................ | 524/862 |
| 4,472,563 | 9/1984 | Chandra et al. ................... | 524/779 |

*Primary Examiner*—Lewis T. Jacobs

[57] ABSTRACT

There is provided an improved addition curable silicone composition wherein the improvement comprises an amount of metallic oxide effective to prevent premature deterioration of the cured composition due to exposure to iodine and/or hydroiodic acid. The preferred metallic oxides are magnesium oxide, zinc oxide and calcium oxide. Methods for making the compositions of the present invention are also provided.

19 Claims, No Drawings

IODINE RESISTANT SILICONE RUBBER COMPOSITIONS

BACKGROUND OF THE INVENTION

The present invention relates to iodine resistant precious metal catalyzed silicone rubber compositions. More particularly, the present invention relates to addition curable silicone rubber compositions containing an amount of metallic oxide effective to prevent premature deterioration of the cured rubber due to exposure to iodine and/or hydroiodic acid.

Addition curable, precious metal catalyzed silicone rubber compositions are well known in the art. Generally, these compositions comprise (a) an alkenyl-containing polydiorganosiloxane base polymer, (b) an organohydrogenpolysiloxane crosslinking agent, and (c) a precious metal or precious metal containing hydrosilation catalyst.

Bobear, U.S. Pat. No. 4,061,609, discloses that an improved work life can be imparted to addition curable silicone rubber compositions by including therein an effective amount of hydroperoxide inhibitor. Bobear further discloses that addition curable silicone rubber compositions can contain from 5 to 150 parts of filler or, more preferably, from 10 to 75 parts of filler. Included in the list of extending fillers are zinc oxide, magnesium oxide, titanium oxide, iron oxide, chromic oxide and zirconium oxide, among others. The Bobear patent, assigned to the same assignee as the present invention, is incorporated by reference into the present disclosure in its entirety.

Recently, precious metal catalyzed, addition curable silicone rubber compositions of the type disclosed by Bobear have been considered by the dairy industry as a replacement for flexible PVC and organic elastomers in milk tubing and dairy inflation applications, respectively. Potential advantages of such addition cured silicone rubber compositions include flexibility at low temperatures, inherent resistance to bacteria growth, and extended longevity.

It has been observed that TUFEL ® silicone rubber tubing has deteriorated at certain dairies within a relatively short period of time, while at other dairies it has demonstrated superior service life in excess of two years.

The present applicants have discovered that the source of such early deterioration is probably due to exposure of the silicone elastomer to iodine and/or hydroiodic acid. This conclusion was based on applicants' analysis which indicated that those dairies experiencing difficulties all use a backflush rinse cycle which exposes the TUFEL ® tubing to short but repetitive contact with dilute iodine sanitizing solutions.

SUMMARY OF THE INVENTION

It is an object of the present invention to provide addition curable silicone rubber compositions which exhibit improved resistance to deterioration upon exposure to iodine and/or hydroiodic acid.

It is another object of the present invention to provide methods for imparting improved resistance to deterioration caused by exposure to iodine and/or hydroiodic acid in addition curable silicone rubber compositions.

In accordance with one aspect of the present invention there is provided an addition curable silicone rubber composition having improved resistance to deterioration caused by exposure to iodine and/or hydroiodic acid, comprising:

(a) an alkenyl-containing polydiorganosiloxane base polymer, (b) an organohydrogenpolysiloxane crosslinking agent, (c) a precious metal or precious metal containing hydrosilation catalyst, and (d) an amount of metallic oxide effective to prevent premature deterioration of the cured silicone rubber composition due to exposure to iodine and/or hydroiodic acid.

DESCRIPTION OF THE INVENTION

There is provided by the present invention an addition curable, precious metal catalyzed silicone rubber composition, comprising:

(a) an alkenyl-containing polydiorganosiloxane base polymer, (b) an organohydrogenpolysiloxane crosslinking agent, (c) a precious metal or precious metal containing hydrosilation catalyst, and (d) an amount of metallic oxide effective to prevent premature deterioration of the cured silicone rubber composition due to exposure to iodine and/or hydroiodic acid.

The alkenyl-containing polydiorganosiloxane base polymer used in the practice of the present invention can be any of those commonly employed by the artisan, for example, as described in Bobear, U.S. Pat. No. 4,061,609.

The organohydrogenpolysiloxane crosslinking agent can be a linear polymer having silicon-bonded hydrogen atoms, a resinous organohydrogenpolysiloxane, or a mixture thereof, also as described in Bobear, U.S. Pat. No. 4,061,609.

Any precious metal or precious metal containing hydrosilation catalyst known in the art can be utilized in the practice of the present invention, however, it is preferable to utilize a platinum or platinum-containing catalyst as described in Bobear, U.S. Pat. No. 4,061,609.

The metallic oxide can be any oxide which is capable of reacting with the iodine and/or hydroiodic acid so as to eliminate premature decomposition of the cured silicone rubber. While not limiting the scope of the present invention based on any particular theory, it is believed that the iodine backflush causes halogenation at sites of unreacted silicon-bonded hydrogen atoms in the cured elastomer as follows:

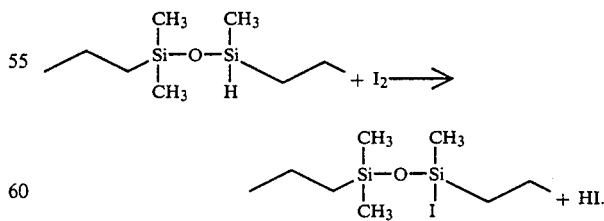

As a weak acid, HI is then capable of re-equilibrating the siloxane polymer chain, leading to chain scission and subsequent reversion of the silicone elastomer. Having discovered the source of the problem, applicants were able to solve the problem by including in the composition an amount of metallic oxide effective to prevent premature deterioration, i.e. by providing an acid acceptor buffering effect.

Preferably, the metallic oxide is a group II A or group II B metal oxide and, more preferably, is selected from the group consisting of magnesium oxide, zinc oxide and calcium oxide. Most preferably, the metallic oxide is magnesium oxide or zinc oxide. Of course, mixtures of metallic oxides are also within the scope of the present invention, although no advantage is derived from using such mixtures.

By an amount of metallic oxide effective to prevent premature deterioration of the cured silicone rubber composition is meant from about 0.25 to about 3 parts by weight per hundred parts by weight of the composition. More preferably, the metallic oxide is employed in an amount ranging from about 0.5 to about 2 parts and, most preferably, in an amount of from about 1.0 to about 1.5 parts by weight per hundred parts by weight of the composition.

It is also contemplated that the compositions of the present invention may contain any of the conventional additives known in the art such as hydroperoxy inhibitors, heat aging additives, reinforcing fillers and the like. If an extending filler is used it should not be a metallic oxide as this may adversely affect the physical properties of the silicone elastomer. A preferred extending filler for use in the present invention is ground silica.

The artisan will appreciate that the present invention will be useful in any industry where repeated exposure to sanitizing solutions is necessary, for example, in the industrial respirator mask field as well as the dairy industry.

The curable compositions of the present invention are prepared by mixing the various ingredients by any suitable means. The cured silicone elastomer is prepared by exposing the curable composition to an elevated temperature for an amount of time sufficient to effect crosslinking. Suitable mixing means as well as effective cure conditions are well known in the art or can be ascertained without undue experimentation.

In order to better enable the artisan to practice the present invention the following examples are provided by way of illustration and not by way of limitation. All parts are by weight unless otherwise noted.

EXAMPLES

EXAMPLE 1

An addition curable composition was prepared by mixing 40 parts by weight of vinyl chainstopped polydimethylsiloxane having a viscosity of 15,000,000 cps. at 25° C.; 40 parts by weight of vinyl chainstopped polydimethyl-methylvinylsiloxane having 0.05 mole percent vinyl on chain and a viscosity of 15,000,000 cps. at 25° C.; 20 parts by weight methyl chainstopped polydimethylmethylvinylsiloxane having 0.6 mole percent vinyl on chain and a viscosity of 17,000,000 cps. at 25° C.; 2 parts by weight of hydroxyl chainstopped polydimethylsiloxane process aid; 2 parts by weight of methylhydrogenpolysiloxane crosslinking agent; 53 parts by weight octamethylcyclotetrasiloxane treated fumed silica, and platinum containing hydrosilation catalyst. To 100 parts by weight of such addition curable composition was added 1 part by weight of zinc oxide. To a second 100 parts by weight sample of the addition curable composition was added 1 part by weight of magnesium oxide. A third sample having no metallic oxide was used as a control.

The respective samples were press cured into sheets which were immersed in iodine sanitizer solution (150 ppm iodine) for 70 hours at 110° F. The results are set forth in Table I.

TABLE I

| Changes in Properties After Iodine Sanitizer Immersion | Control | 1 pph ZnO | 1 pph MgO |
|---|---|---|---|
| Shore A, Durometer (pts) | −6 | +1 | −2 |
| Tensile Strength, % | −61 | −18 | −5 |
| Elongation, % | −62 | −15 | −10 |

These results show that improved resistance to iodine degradation is obtained by including a metallic oxide in the addition curable silicone composition.

We claim:

1. In an addition curable silicone composition, the improvement comprising from about 0.25 to about 3 parts by weight per hundred parts by weight of the composition of metallic oxide effective to prevent premature deterioration of the cured composition due to exposure to iodine and/or hydroiodic acid.

2. A composition as in claim 1, wherein the metallic oxide is a group II A or group II B metal oxide.

3. A composition as in claim 2, wherein the metallic oxide is selected from the group consisting of magnesium oxide, zinc oxide and calcium oxide.

4. A composition as in claim 2, wherein the metallic oxide is selected from the group consisting of magnesium oxide and zinc oxide.

5. A composition as in claim 1, 2, 3 or 4, wherein the metallic oxide is present in an amount of from about 0.5 to about 2 parts by weight per hundred parts by weight of the composition.

6. A composition as in claim 1, 2, 3 or 4, wherein the metallic oxide is present in an amount of from about 1.0 to about 1.5 parts by weight per hundred parts by weight of the composition.

7. A composition as in claims 1, 2, 3 or 4, wherein the addition curable silicone composition comprises:
   (a) an alkenyl-containing polydiorganosiloxane base polymer,
   (b) an organohydrogenpolysiloxane crosslinking agent, and
   (c) an effective amount of precious metal or precious metal containing hydrosilation catalyst.

8. In a method for making an addition curable silicone composition, the improvement comprising mixing therein from about 0.25 to about 3 parts by weight per hundred parts by weight of the composition of metallic oxide effective to prevent premature deterioration of the cured composition due to exposure to iodine and/or hydroiodic acid.

9. A method as in claim 8, wherein the metallic oxide is a group II A or group II B metal oxide.

10. A method as in claim 9, wherein the metallic oxide is selected from the group consisting of magnesium oxide, zinc oxide and calcium oxide.

11. A method as in claim 9, wherein the metallic oxide is selected from the group consisting of magnesium oxide and zinc oxide.

12. The cured composition of claim 1.

13. The cured composition of claim 2.

14. The cured composition of claim 3.

15. The cured composition of claim 4.

16. A method for making silicone elastomeric composition having improved resistance to deterioration due to exposure to iodine and/or hydroiodic acid, comprising:

I. Mixing:
   (a) an alkenyl-containing polydiorganosiloxane base polymer,
   (b) an organohydrogenpolysiloxane crosslinking agent,
   (c) an effective amount of precious metal or precious metal containing hydrosilation catalyst, and
   (d) from about 0.25 to about 3 parts by weight per hundred parts by weight of the composition of metallic oxide effective to prevent premature deterioration of the silicone elastomer due to exposure to iodine or hydroiodic acid; and II. curing the composition of step I.

17. A method as in claim 16, wherein the metallic oxide is a group II A or group II B metal oxide.

18. A method as in claim 17, wherein the metallic oxide is selected from the group consisting of magnesium oxide, zinc oxide and calcium oxide.

19. A method as in claim 17, wherein the metallic oxide is selected from the group consisting of magnesium oxide and zinc oxide.

* * * * *